F. A. SPRAGUE.
SURGICAL DEVICE FOR USE IN SETTING BROKEN BONES.
APPLICATION FILED MAY 1, 1915.
1,170,494.                                        Patented Feb. 1, 1916.
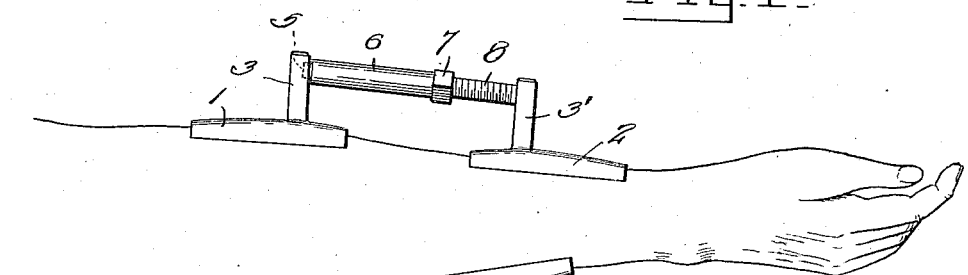
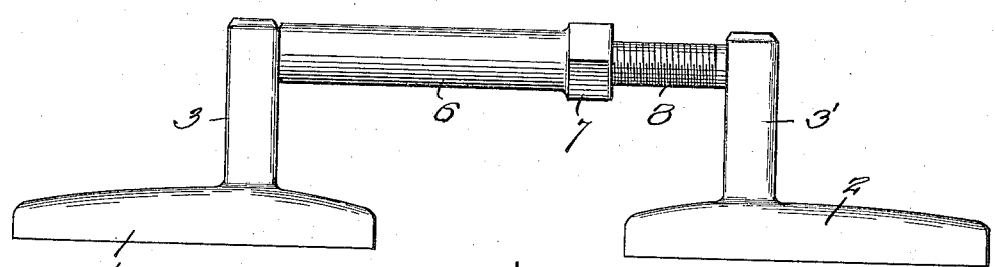
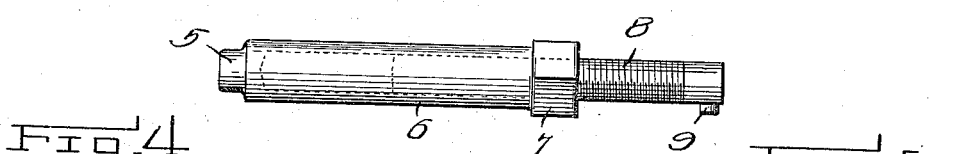
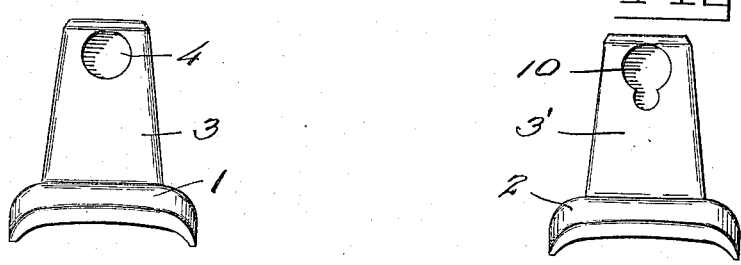
Fred A. Sprague
Inventor
By Lester L. Sargent
Attorney

UNITED STATES PATENT OFFICE.

FRED A. SPRAGUE, OF CONCORD, NEW HAMPSHIRE.

SURGICAL DEVICE FOR USE IN SETTING BROKEN BONES.

1,170,494. Specification of Letters Patent. Patented Feb. 1, 1916.

Application filed May 1, 1915. Serial No. 25,183.

*To all whom it may concern:*

Be it known that I, FRED A. SPRAGUE, a citizen of the United States, residing at Concord, in the county of Merrimack and State of New Hampshire, have invented a new and useful Surgical Device for Use in Setting Broken Bones, of which the following is a specification.

The object of my invention is to provide an improved surgical device for setting broken bones which will prevent the muscles from turning the arm or leg together, and will also hold the bone in perfect apposition and alinement, so that it is not necessary to use weights in the case of a broken leg.

It is an especial object of my invention to provide an adjustable splint made entirely of metal and comprising oppositely-disposed coöperating mechanism. Thus, after the cast is all on, if an X-ray photograph taken a few days later should disclose the fact that the broken end of the bone had slipped down so that the bone was not in perfect apposition and alinement, it might be brought back into alinement by shortening or lengthening the connecting adjustable tube and threaded shaft of one of the splints.

It is an important object of my invention to provide a device of this nature having fewer parts, and which in consequence is more rigid and less likely to be moved out of place than devices held together by ball and socket joints, screws, etc., and which on account of having less parts is cheaper to manufacture.

It is a further object of my invention to provide a device which allows the plaster cast to be made between the pads as well as over them.

It is a further object of my invention to provide pad members of such contour that the device may be applied to a broken collar bone as well as to a leg or arm.

I attain the objects of my invention by the mechanism illustrated in the accompanying drawings, in which—

Figure 1 is a side elevation of the invention in use; Fig. 2 is an enlarged side view of one of the splints; Fig. 3 is a detail view of the stretching mechanism; Fig. 4 is an end view of member 1 viewed from the inner end; Fig. 5 is an end view of member 2 viewed from the inner end.

Like numerals indicate like parts throughout the several views.

Referring to the accompanying drawings, I provide a concave splint pad 1, shaped to fit the contour of the limb, and having an upstanding arm 3, which is provided with a round recess at its upper end (inner side). Coacting with member 1, I provide a similar concave splint pad 2, having an upstanding arm 3', provided with an approximately key-shaped recess 10 in its upper end (inner side). The aforesaid recesses are disposed so as to face each other. In connection with the aforesaid splint pads, I provide stretching mechanism extending between arms 3 and 3', comprising an interiorly threaded tube 6, having an end portion 5 of smaller diameter, adapted to engage in recess 4 of arm 3, as illustrated in Fig. 1. The tube is also provided with means for turning it, in the form of a nut-shaped portion 7, as illustrated. Operatively engaged with sleeve 6, I provide a non-rotating threaded shaft 8 having a key 9 at its outer end, adapted to engage in recess 10 of arm 3', as will be understood by reference to Figs. 3 and 5.

The parts are of metal, the pads shaped to fit the contour of arm, leg or collar bone, and are about 4 inches in length by one and one-half inches in width.

In operation, the splint pads are placed on the broken limb with the tube and threaded shaft removed. This allows the plaster cast to be made between the pads as well as over them, an advantage believed to be novel with this invention. After the plaster cast is set the tube and threaded shaft are put in place between the upstanding arms of the splint pads and screwed up until there is tension enough to prevent the muscles from drawing the bone back or allowing the bone to slip out of place. By adjusting the connecting tube and shaft of one of the splint pad sets, bones which are not in perfect alinement can be brought into alinement. As applied to a limb, two sets of the mechanism, oppositely disposed, are used, thus doing away with bandaging devices. An X-ray picture may be taken through the cast at any time while the bones are growing together, which will show exactly the position in which they are placed.

The device may be used with equal facility on a collar bone, as on a leg or arm, an advantage not possessed by adjustable splints heretofore devised.

What I claim is:

1. A device of the character described, comprising splint pads conforming to the contour of the parts of the body to which the device is adapted to be applied each, of the pads having an integral upstanding arm, a removable member adapted to engage in non-rotatable relation in the arm of one pad, a coöperating removable member adapted to engage in rotatable relation in the opposing arm of the other pad, and means for rotating the latter member to adjustably press the upstanding arms farther apart, for the purposes set forth in the foregoing specification.

2. A device of the character described, comprising concave splint pads each having an upstanding arm recessed at the upper inner end portion, one of the aforesaid recessed portions being round and the other of approximately key shape, a threaded shaft having a key at one end retained in non-rotating position by the arm having the key-shaped recess, and an interiorly threaded tube in adjustable engagement with the threaded shaft and having a smaller cylindrical end portion in rotatable engagement in the arm having a round recessed portion and having means for turning the tube member, whereby to adjustably stretch the splint pads apart for the purposes described.

FRED A. SPRAGUE.

Witnesses:
JOSEPH A. DONIGAN,
CARL A. HALL.